(12) United States Patent
Kimura

(10) Patent No.: US 7,830,306 B2
(45) Date of Patent: Nov. 9, 2010

(54) POSITIONING APPARATUS, CONTROL METHOD OF POSITIONING APPARATUS, CONTROL PROGRAM FOR POSITIONING APPARATUS, AND COMPUTER READABLE RECORDING MEDIUM FOR STORING CONTROL PROGRAM FOR POSITIONING APPARATUS

(75) Inventor: Akira Kimura, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 1041 days.

(21) Appl. No.: 11/592,191

(22) Filed: Nov. 3, 2006

(65) Prior Publication Data

US 2007/0104256 A1 May 10, 2007

(30) Foreign Application Priority Data

Nov. 9, 2005 (JP) ............................. 2005-325041

(51) Int. Cl.
*G01S 19/22* (2010.01)
*G01S 19/37* (2010.01)

(52) U.S. Cl. .............................. 342/357.61; 342/357.77
(58) Field of Classification Search ............ 342/357.02, 342/357.22, 357.61, 357.77
See application file for complete search history.

(56) References Cited

U.S. PATENT DOCUMENTS

| 5,101,416 | A |   | 3/1992 | Fenton et al. |
| 5,764,686 | A | * | 6/1998 | Sanderford et al. ......... 375/149 |
| 5,918,161 | A |   | 6/1999 | Kumar et al. |
| 6,437,733 | B1 | * | 8/2002 | Selva Vera ............. 342/357.02 |
| 6,868,110 | B2 |   | 3/2005 | Phelts et al. |
| 2007/0274375 | A1 | * | 11/2007 | Ray et al. ................... 375/148 |

FOREIGN PATENT DOCUMENTS

| JP | H10-339772 A | 12/1998 |
| JP | 2000312163 A * | 11/2000 |
| WO | WO-2005/098469 A1 | 10/2005 |

OTHER PUBLICATIONS

Schnaufer et al, "Peak Tracking/Measurement Compensating Multipath Mitigation Technique," IEEE 2000, pp. 49-59.*
Braasch, "Performance Comparison of Multipath Mitigating Receiver Architectures," IEEE, 2001, pp. 3-1309 to 3-1315.*
M. Irsigler and B. Eissfeller: "Comparison of Multipath Mitigation Techniques with Consideration of Future Signal Structures". Proceedings of IONGNSS 2003, Sep. 9, 2003, pp. 2584-2592, XP002412392 Portland, OR, USA, the whole document.

* cited by examiner

*Primary Examiner*—Gregory C Issing
(74) *Attorney, Agent, or Firm*—Global IP Counselors, LLP

(57) ABSTRACT

A positioning apparatus for positioning a current position based on satellite signals from positioning satellites includes: satellite signal receiving means, correlation information generating means, tentative code peak position information generating means, statistical processing range information generating means, statistical information generating means for generating statistical information by performing a statistical processing of the correlation values within the statistical processing range for each partial range specified as a limited range rather than the statistical processing range, beginning position information generating means, and direct wave code peak corresponding position information generating means for generating direct wave code peak corresponding position information which indicates a direct wave code peak corresponding position corresponding to a direct wave code peak, which is the maximum correlation value between the direct wave and the replica satellite signal, based on the beginning position information.

3 Claims, 16 Drawing Sheets

F I G.1
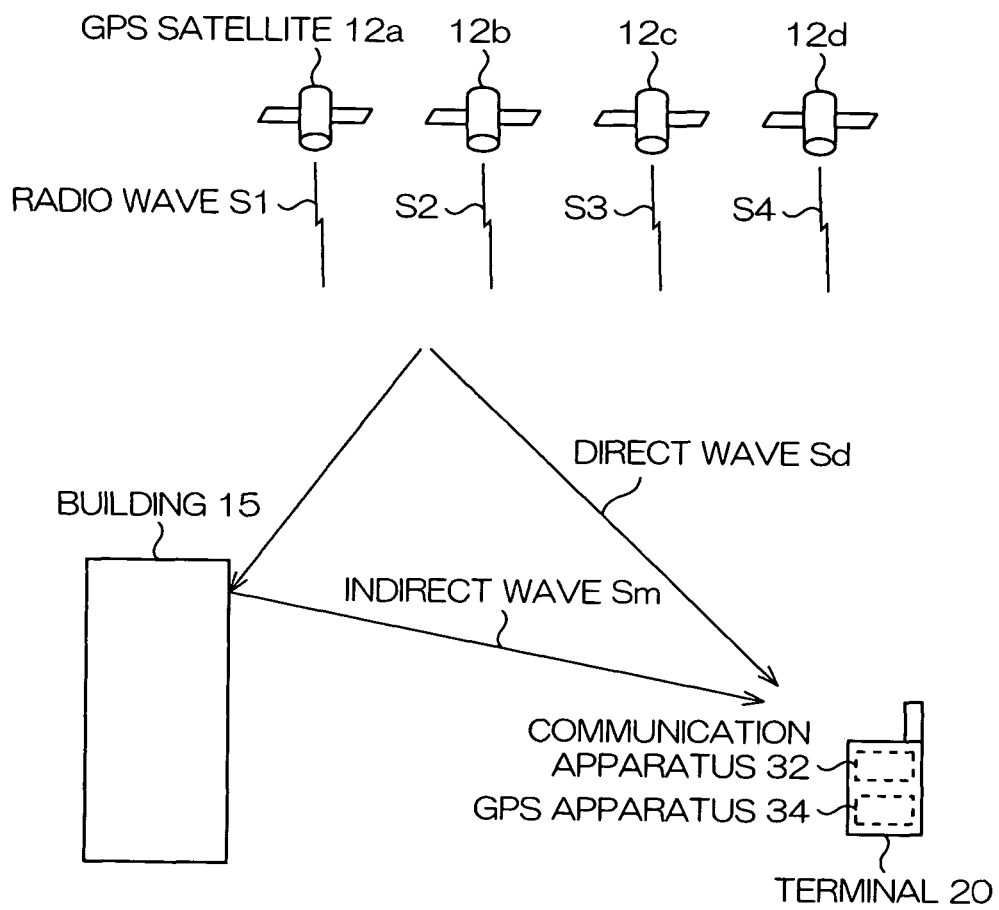

(a)

(b)

FORMULA 1: $\sigma^2 = \frac{1}{n}\Sigma\left((f(x))^2 - \left(\frac{\Sigma f(x)}{n}\right)^2\right)$ (a)

(b)

(c)

(a)

(b)

(c)

(a)

(b)

(c)

(a)

(b)

(c)

(a)

(b)

(c)

(a)

(b)

POSITIONING APPARATUS, CONTROL METHOD OF POSITIONING APPARATUS, CONTROL PROGRAM FOR POSITIONING APPARATUS, AND COMPUTER READABLE RECORDING MEDIUM FOR STORING CONTROL PROGRAM FOR POSITIONING APPARATUS

This application claims the priorities benefit under 35 U.S.C. §119 of Japanese Patent Application No. 2005-325041 filed on Nov. 9, 2005, which is hereby incorporated in its entirety by reference.

BACKGROUND

1. Technical Field

The present invention relates to a positioning apparatus which uses radio waves from positioning satellites, a control method of the positioning apparatus, a control program for the positioning apparatus, and a computer readable recording medium for storing the control program for the positioning apparatus.

2. Related Art

Conventionally, positioning systems for positioning a current position of each GPS (Global Positioning System) receiver using a satellite navigation system such as GPS have been used.

Such GPS receiver receives a C/A (Clear and Acquisition or Coarse and Access) code, which is one of pseudo random noise codes (hereinafter, referred to as PN (Pseudo random Noise) code), put on radio waves from GPS satellites, based on navigation messages (rough satellite orbit information: almanac, accurate satellite orbit information: ephemeris) which indicate orbits and the like of the GPS satellites. The C/A code is a code serving as a positioning standard.

The GPS receiver then identifies which GPS satellite transmits the C/A code, and calculates the distance (pseudo range) between the GPS satellite and the GPS receiver based on the time at which the C/A code is transmitted and the time at which it is received. The GPS receiver then positions the position of the GPS receiver based on the pseudo range of three or more of GPS satellites and the position of each GPS satellite on satellite orbit (see JP-A-10-339772).

According to the aforementioned GPS receiver, phases of the received C/A codes and replica C/A codes stored in the GPS receiver are aligned with each other, and a position (hereinafter, referred to as code peak position) which indicates the maximum correlation value is thereby calculated.

The aforementioned pseudo range is then calculated using the code peak position.

However, the GPS receiver may receive both satellite radio waves as direct waves and those as indirect waves (hereinafter, referred to as multipaths) which are reflected from a building or the like. If the direct waves and the multipaths are combined, the aforementioned code peak position deviates from a position (hereinafter, referred to as true position) in the case where only direct waves are received. Accordingly, the pseudo range deviates from the true distance. This causes decrease in accuracy of positioning position.

In this case, use of a narrow-correlator (U.S. Pat. No. 5,101,416), for example, allows identification of a code peak position at the true position, despite the effects of the multipaths.

However, since such narrow-correlator uses a wider frequency bandwidth, it is difficult for it to be applied to GPS receivers for receiving weak radio waves.

On the other hand, focusing on the fact that the beginning position of the code peak is fixed even though multipaths are included because the multipaths are always received after the direct waves, a technology to first compensate for noise floors by calculating and integrating (performing time integration of) correlation results sequentially, then identify the code peak beginning position, and calculate the code peak position from the beginning position has been proposed (e.g., U.S. Pat. No. 6,868,110B2).

However, according to the aforementioned prior art, it is necessary to calculate a necessary number of correlation results to compensate for noise floors in the Gauss distribution. Therefore, there is a problem that it is not suitable especially for mobile units, since time for only calculating multiple correlation results is necessary before calculation of the true code peak position, and it takes 10 seconds or more for initialization.

SUMMARY

Therefore, an advantage of some aspects of the invention is to provide a positioning apparatus capable of calculating the true code peak position by quickly eliminating effects of multipaths without performing time integration of the correlation results, a control method of the positioning apparatus, a control program for the positioning apparatus, and a computer readable recording medium for storing the control program for the positioning apparatus.

In order to achieve the above object, a positioning apparatus for positioning a current position based on satellite signals from positioning satellites according to a first aspect of the invention includes: satellite signal receiving means for receiving the satellite signals; correlation information generating means for generating correlation information which indicates correlation values between the satellite signal and a replica satellite signal generated by the positioning apparatus; tentative code peak position information generating means for generating tentative code peak position information which indicates a tentative code peak position on a time axis corresponding to a code peak, which is the maximum correlation value, based on the correlation information; statistical processing range information generating means for generating statistical processing range information which indicates a statistical processing range of a statistical processing of the correlation values indicated in the correlation information, based on a possible effect range of an indirect wave of the satellite signal to the correlation information of a direct wave of the satellite signal and the tentative code peak position information; statistical information generating means for generating statistical information by performing a statistical processing of the correlation values within the statistical processing range for each partial range specified as a limited range rather than the statistical processing range; beginning position information generating means for generating beginning position information which indicates a beginning position of the code peak based on the statistical information; and direct wave code peak corresponding position information generating means for generating direct wave code peak corresponding position information which indicates a direct wave code peak corresponding position corresponding to a direct wave code peak, which is the maximum correlation value between the direct wave and the replica satellite signal, based on the beginning position information.

With the structure according to the first aspect of the invention, the positioning apparatus can generate the tentative code peak position information using the tentative code peak position information generating means. Here, the satellite signal received by the positioning apparatus may include not only direct waves but also indirect waves. Therefore, the tentative code peak position does not always match with a code peak position (true code peak position) in the case where only the direct waves are received.

The positioning apparatus can generate the statistical processing range information using the statistical processing range information generating means. In other words, the positioning apparatus does not use the tentative code peak position as is for positioning, but uses it as a standard for specifying the statistical processing range.

In addition, the positioning apparatus can generate statistical information which indicates variation in the statistical standard values using the statistical information generating means.

The positioning apparatus can also generate beginning position information which indicates a beginning position of the code peak based on the statistical information using the beginning position information generating means. In this manner, the beginning position information generating means generates the beginning position based on the statistical information instead of based on the correlation information, the effects of noise floors are thereby eliminated or reduced. In other words, decrease in accuracy of the beginning position due to noise floors is eliminated or reduced. In this case, the statistical information is generated by performing a statistical processing of the correlation values for each partial range instead of performing time integration of the correlation information. In other words, since there is no need to generate multiple pieces of correlation information, the time to be taken for generation of them is not needed. An inventor of this specification has confirmed, through an experiment, the fact that the statistical processing for each of multiple partial ranges takes extremely shorter time than generation of multiple pieces of the correlation information in order to obtain a necessary number of samples to eliminate or reduce the effects of noise floors.

In addition, the positioning apparatus can generate the direct wave code peak corresponding position information (which indicates true code peak position) based on the beginning position information using the direct wave code peak corresponding position information generating means.

This allows calculation of the true code peak position by quickly eliminating the effects of multipaths without performing time integration of the correlation results.

A second aspect of the invention is a positioning apparatus with a structure according to the first aspect of the invention, wherein the partial range is specified as a range which includes a necessary number of the correlation values to compensate for noise floors in Gauss distribution.

With the structure according to the second aspect of the invention, the code peak corresponding position can be calculated by reliably eliminating the effects of noise floors.

A third aspect of the invention is a positioning apparatus with the structure according to any of the first and the second aspect of the invention, wherein the statistical processing is a processing of calculating variance values or an average value of the correlation values within the statistical processing range.

With the structure according to the third aspect of the invention, the positioning apparatus can reduce or eliminate the effects of noise floors in the process of calculating the variance values or the average value.

In order to achieve the above object, a control method of a positioning apparatus, according to a fourth aspect of the invention, includes the steps of: receiving satellite signals by means of a positioning apparatus for positioning a current position, based on the satellite signals from positioning satellites; generating correlation information which indicates correlation values between the satellite signal and a replica satellite signal generated by the positioning apparatus by means of the positioning apparatus; generating tentative code peak position information which indicates a tentative code peak position on a time axis corresponding to a code peak, which is the maximum correlation value, by means of the positioning apparatus, based on the correlation information; generating statistical processing range information which indicates a statistical processing range for performing a statistical processing of the correlation values indicated in the correlation information by means of the positioning apparatus, based on a possible effect range of an indirect wave of the satellite signal to the correlation information of a direct wave of the satellite signal and the tentative code peak position information; generating statistical information by performing a statistical processing of the correlation values within the statistical processing range for each partial range specified as a limited range rather than the statistical processing range by means of the positioning apparatus; generating beginning position information which indicates a beginning position of the code peak by means of the positioning apparatus, based on the statistical information; and generating direct wave code peak corresponding position information which indicates a direct wave code peak corresponding position corresponding to a direct wave code peak, which is the maximum correlation value between the direct wave and the replica satellite signal, by means of the positioning apparatus, based on the beginning position information.

With the structure according to the fourth aspect of the invention, as with the structure according to the first aspect of the invention, it is possible to calculate the true code peak position by quickly eliminating the effects of multipaths without performing time integration of the correlation results.

In order to achieve the above object, a control program for a positioning apparatus, according to a fifth aspect of the invention, instructing a computer to perform the steps of: receiving satellite signals by means of a positioning apparatus for positioning a current position, based on the satellite signals from positioning satellites; generating correlation information which indicates correlation values between the satellite signal and a replica satellite signal generated by the positioning apparatus by means of the positioning apparatus; generating tentative code peak position information which indicates a tentative code peak position on a time axis corresponding to a code peak, which is the maximum correlation value, by means of the positioning apparatus, based on the correlation information; generating statistical processing range information which indicates a statistical processing range for performing a statistical processing of the correlation values indicated in the correlation information by means of the positioning apparatus, based on a possible effect range of an indirect wave of the satellite signal to the correlation information of a direct wave of the satellite signal and the tentative code peak position information; generating statistical information by performing a statistical processing of the correlation values within the statistical processing range for each partial range specified as a limited range rather than the statistical processing range by means of the positioning apparatus; generating beginning position information which indicates a beginning position of the code peak by means of the positioning apparatus, based on the statistical information; and generating direct wave code peak corresponding position information which indicates a direct wave code peak corresponding position corresponding to a direct wave code peak, which is the maximum correlation value between the direct wave and the replica satellite signal, by means of the positioning apparatus, based on the beginning position information.

In order to achieve the above object, a computer readable recording medium for storing a control program for a positioning apparatus, according to a sixth aspect of the invention, instructs a computer to perform the steps of: receiving satellite signals by means of a positioning apparatus for positioning a current position, based on the satellite signals from positioning satellites; generating correlation information which indicates correlation values between the satellite signal and a replica satellite signal generated by the positioning apparatus by means of the positioning apparatus; generating tentative code peak position information which indicates a tentative code peak position on a time axis corresponding to a code peak, which is the maximum correlation value, by means of the positioning apparatus, based on the correlation information; generating statistical processing range information which indicates a statistical processing range for performing a statistical processing of the correlation values indicated in the correlation information by means of the positioning apparatus, based on a possible effect range of an indirect wave of the satellite signal to the correlation information of a direct wave of the satellite signal and the tentative code peak position information; generating statistical information by performing a statistical processing of the correlation values within the statistical processing range for each partial range specified as a limited range rather than the statistical processing range by means of the positioning apparatus; generating beginning position information which indicates a beginning position of the code peak by means of the positioning apparatus, based on the statistical information; and generating direct wave code peak corresponding position information which indicates a direct wave code peak corresponding position corresponding to a direct wave code peak, which is the maximum correlation value between the direct wave and the replica satellite signal, by means of the positioning apparatus, based on the beginning position information.

BRIEF DESCRIPTION OF THE DRAWINGS

The invention will be described with reference to the accompanying drawings, wherein like numbers reference like elements.

FIG. 1 schematically shows a terminal and the like in an embodiment according to the invention.

FIG. 7 is a diagram for describing variance value calculating program and the like.

FIG. 8 is a diagram for describing the variance value calculating program and the like.

FIG. 9 is a diagram for describing the variance value calculating program and the like.

FIG. 10 is a diagram for describing the variance value calculating program and the like.

FIG. 11 is a diagram for describing the variance value calculating program and the like.

DESCRIPTION OF EXEMPLARY EMBODIMENTS

Figure 2:
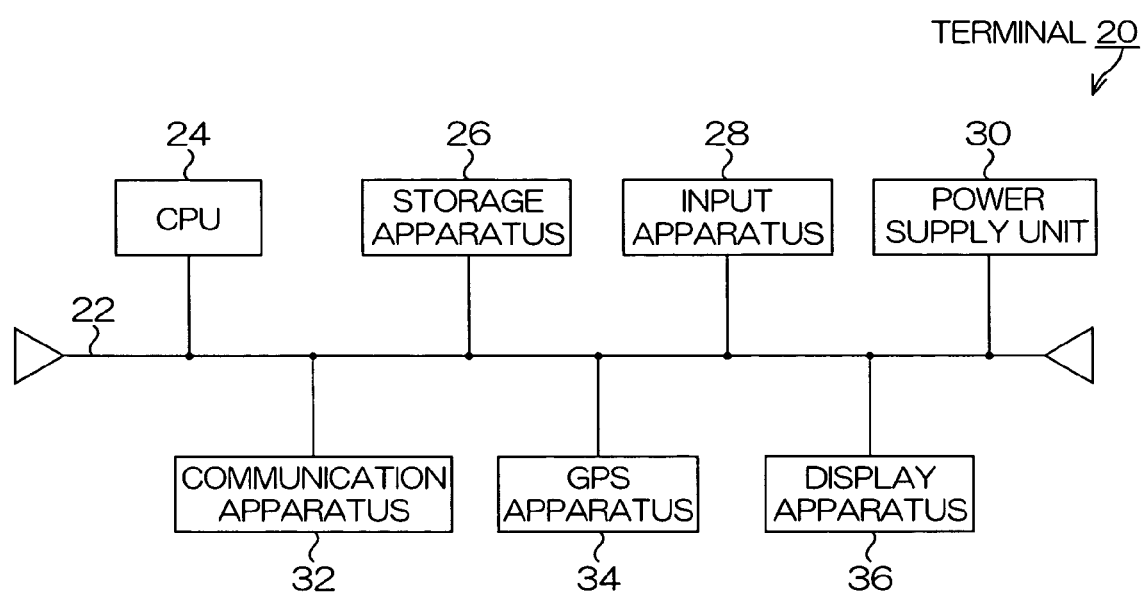
FIG. 2 schematically shows a main hardware structure of the terminal.

Hereinafter, with reference to the drawings, the preferred exemplary embodiments of the invention will be described in detail.

The following embodiments are given various limitations that are preferable technically because they are the exemplary specific examples of the invention, however, the scope of the invention is not limited to these aspects unless there is a particular description to limit the invention in the following description.

FIG. 1 schematically illustrates a terminal 20 and the like in an embodiment according to the invention.

As illustrated in FIG. 1, the terminal 20 can receive radio waves S1, S2, S3 and S4 from positioning satellites, such as GPS satellites 12a, 12b, 12c and 12d.

Various codes are put on the radio waves S1 and the like. One of these codes is C/A code. The C/A code is configured with 1,023 chips. The C/A code is a signal with the bit rate of 1,023 Mbps and the bit length of 1,023 bits (1 msec). The terminal 20, which is an example of positioning apparatus for positioning a current position, positions a current position using the C/A code. The C/A code is an example of satellite signals.

The terminal 20 receives C/A codes from three or more of different GPS satellites 12a and the like, allowing positioning of a current position.

First, the terminal 20 identifies which GPS satellite corresponds to the received C/A code. Next, the distance (hereinafter, referred to as pseudo range) between each GPS satellite 12a or the like and the terminal 20 is calculated based on the time at which the C/A code is transmitted and the time at which it is received. A current position is then positioned based on the position of each of the GPS satellites 12a and the like on the satellite orbit at the current time and the above-mentioned pseudo range.

However, the radio waves S1 and the like may be received by the terminal 20 as direct waves Sd, or may be received by the terminal 20 as indirect waves Sm (also referred to as multipaths) reflected from a building 15 or the like. When the terminal 20 receives both the direct waves Sd and the indirect waves Sm, the time at which the C/A code is received does not match with that in the case where only direct waves are received due to the indirect waves Sm, causing decrease in accuracy of pseudo distance. This also causes decrease in accuracy of positioning position.

As described below, the terminal 20 can quickly eliminate effects of the indirect waves Sm.

The terminal 20 may be, for example, a cellular phone, a PHS (Personal Handy-phone System), PDA (Personal Digital Assistance) or the like, but not limited to these.

In addition, the number of the GPS satellites 12a and the like may not be limited to four, may be three, or may be five or more.

Main Hardware Structure of Terminal 20

FIG. 2 schematically illustrates a main hardware structure of the terminal 20.

As illustrated in FIG. 2, the terminal 20 includes a computer, which is equipped with a bus 22. A CPU (Central Processing Unit) 24, a storage apparatus 26, and the like are connected with the bus 22. The storage apparatus 26 may be a RAM (Random Access Memory), a ROM (Read Only Memory), or the like.

In addition, an input apparatus 28, a power supply unit 30, a communication apparatus 32, a GPS apparatus 34, and a display apparatus 36 are connected with the bus 22.

Main Software Structure of Terminal 20

Figure 3:
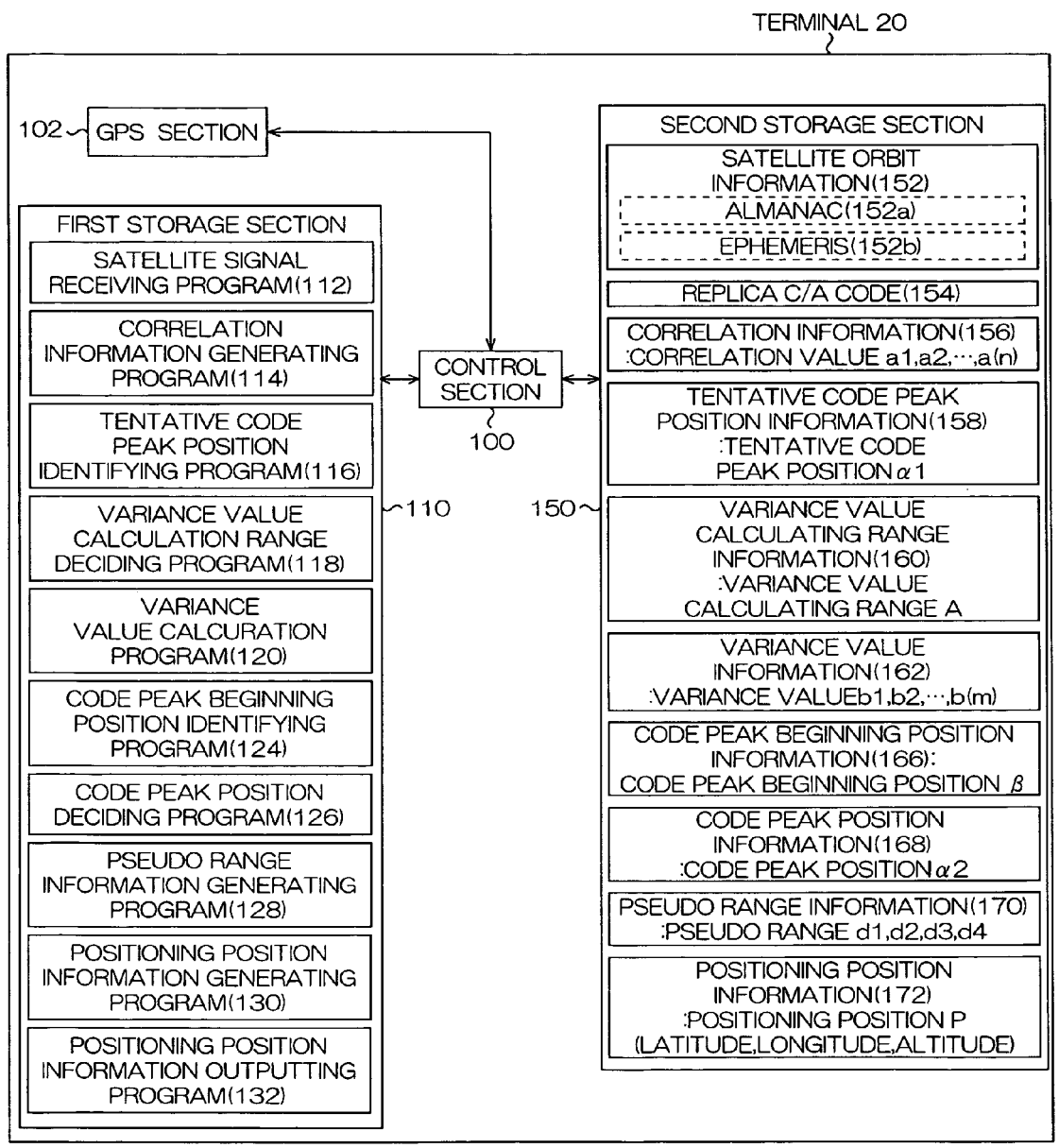
FIG. 3 schematically shows a main software structure of the terminal.

FIG. 3 schematically illustrates a main software structure of the terminal 20.

As illustrated in FIG. 3, the terminal 20 includes a control section 100 for controlling each section, GAPS section 102 corresponding to the GPS apparatus 34 in FIG. 2, a first storage section 110 for storing each program, and a second storage section 150 for storing each piece of information.

As illustrated in FIG. 3, the terminal 20 stores satellite orbit information 152 in the second storage section 150. The satellite orbit information 152 includes almanac 152a and ephemeris 152b. The almanac 152a is information which indicates rough orbits of all GPS satellites 12a and the like. The ephemeris 152b is information which indicates accurate orbits of each GPS satellite 12a or the like.

The terminal 20 uses the almanac 152a and the ephemeris 152b for positioning.

As illustrated in FIG. 3, the terminal 20 stores a satellite signal receiving program 112 in the first storage section 110. The satellite signal receiving program 112 is a program that the control section 100 receives the C/A codes and the like put on the radio waves S1 and the like from the GPS satellites 12a and the like using the GPS section 102. In other words, the satellite signal receiving program 112 and the control section 100 is an example of satellite signal receiving means.

As illustrated in FIG. 3, the terminal 20 stores a correlation information generating program 114 in the first storage section 110. The correlation information generating program 114 is a program that the control section 100 generates correlation information 156 which indicates correlation values a1 and the like between C/A codes (hereinafter, referred to as received C/A code) received from the radio waves S1 and the like and replica C/A codes generated by the terminal 20. The replica C/A code is an example of replica satellite signals. The correlation information generating program 114 and the control section 100 is an example of correlation information generating means.

The terminal 20 stores replica C/A codes for each of GPS satellites 12a and the like as replica C/A codes 154 in the second storage section 150, accommodating to C/A codes different for each of GPS satellites 12a and the like. The control section 100 then refers to the replica C/A codes 154, and generates respective replica C/A codes for the GPS satellite 12a and the like.

The control section 100 stores the generated correlation information 156 in the second storage section 150. It should be noted that information which indicates each correlation value a1 includes its phase information (corresponding to a position on x axis in FIG. 4 to be described later).

Figure 4:
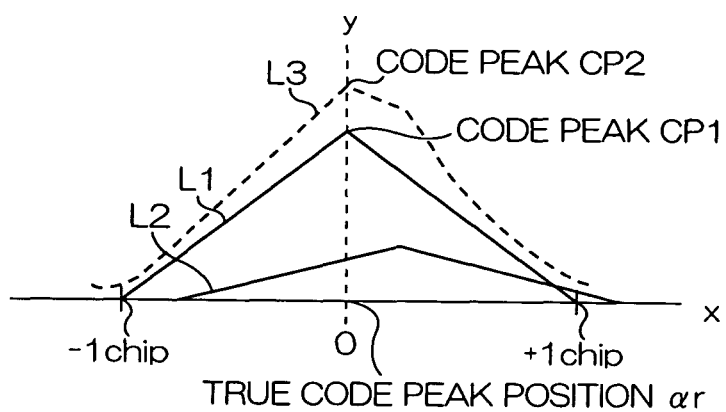
FIG. 4 schematically shows an example of a correlation value curve.
Figure 4:
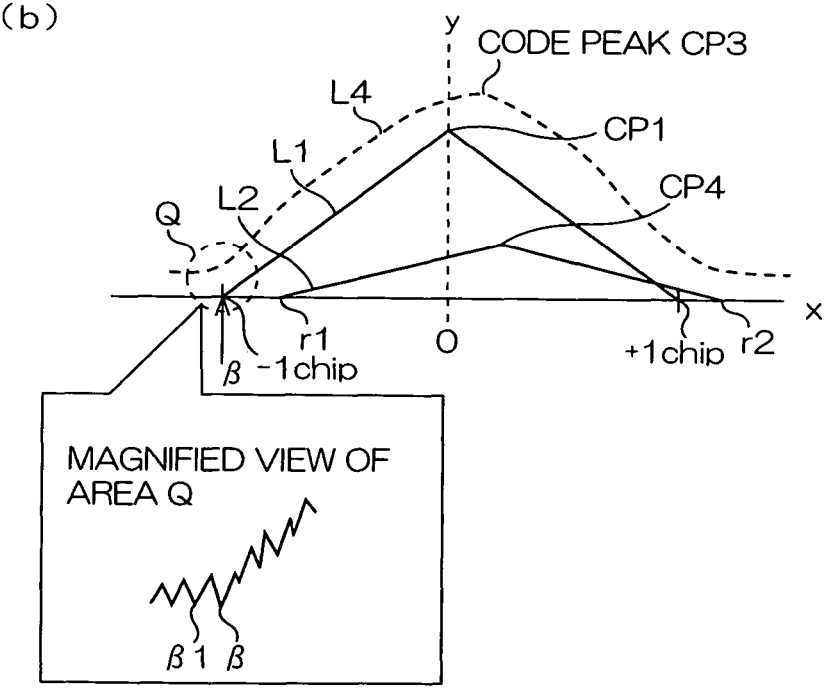

FIG. 4 illustrates an exemplary correlation value curve generated by connecting correlation values.

The control section 100 aligns the phases of the received C/A code and the replica C/A code while relatively moving the phases thereof. The x axis indicates time positions for the phase alignment. The y axis indicates the correlation values as output power values.

FIG. 4(a) illustrates correlation value curves in the case of assuming that the frequency bandwidth is infinite.

When the terminal 20 receives only the direct waves Sd, the correlation value curve becomes a curve L1 in FIG. 4(a). A time position 0 in this case is a true code peak position $\alpha r$ at the current position of the terminal 20. The code peak means the maximum correlation value.

The code peak extends one chip forward and one chip backward the code peak position $\alpha r$, the curve L1 forms an isosceles triangle which consists of the code peak CP1 as the apex and the base with the length of 2 chips.

In addition, if the terminal 20 receives only the indirect waves Sm, the correlation value curve becomes a curve L2 in FIG. 4(a). As illustrated in FIG. 4(a), in the case where only the indirect waves Sm are received, the code peak position deviates backward from the true code peak position.

Moreover, when the terminal 20 receives both the direct waves Sd and the indirect waves Sm, the correlation value curve becomes a curve L3 in FIG. 4(a).

As illustrated in FIG. 4(a), even if the direct waves Sd are affected by the indirect waves Sm, the code peak position matches with the true code peak position $\alpha r$.

However, since the radio waves S1 and the like from the GPS satellites 12a and the like are weak, the frequency bandwidth for receiving them must be decreased in order to receive them while distinguishing from noise floors.

Therefore, if the terminal 20 receives both the direct waves Sd and the indirect waves Sm, the correlation value curve becomes a curve L4 in FIG. 4(b). In other words, the code peak position does not match with the true code peak position $\alpha r$.

On the other hand, the code peak beginning position $\beta$ on the curve 4 matches with that on the curve L1. As described below, the terminal 20 calculates the true code peak position using the feature that the code peak beginning position $\beta$ does not move even if the direct waves Sd are affected by the indirect waves Sm. However, as illustrated in a magnified view of an area Q, the correlation value curve L4 is affected by noise floors, resulting in a curve with great amplitude. Therefore, it is difficult to distinguish the true beginning position $\beta$ from a surround position $\beta1$. At this point, the terminal 20 can identify the true beginning position $\beta$ by eliminating or reducing the effects of noise floors, as described below.

As illustrated in FIG. 3, the terminal 20 stores a tentative code peak position identifying program 116 in the first storage section 110. The tentative code peak position identifying program 116 is a program that the control section 100 generates tentative code peak position information 158 which indicates a tentative code peak position $\alpha1$, which is a position on the time axis corresponding to a code peak shown in the correlation information 156. The tentative code peak position $\alpha1$ is an example of tentative code peak positions. The tentative code peak position identifying program 116 and the control section 100 is an example of tentative code peak position information generating means.

Figure 5:
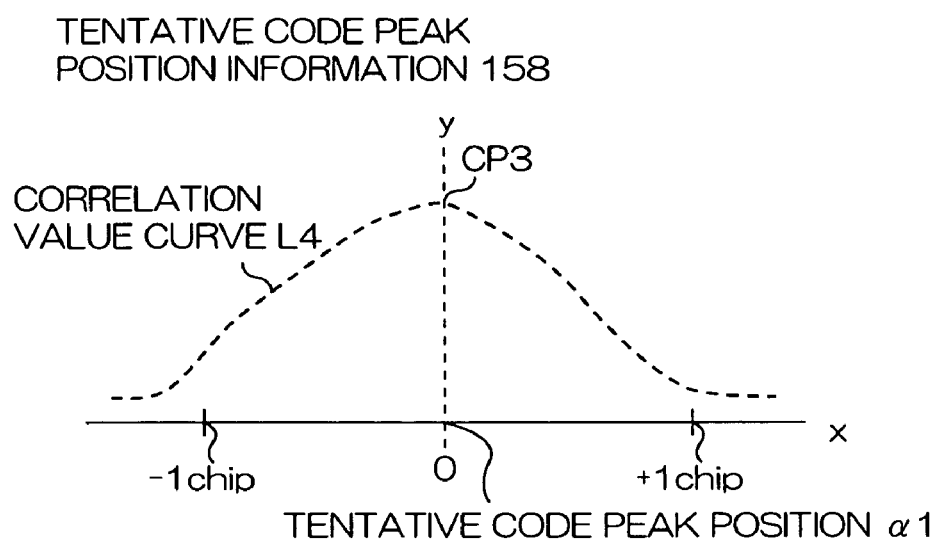
FIG. 5 schematically shows tentative code peak position information.

FIG. 5 schematically illustrates the tentative code peak position information 158.

As illustrated in FIG. 5, the control section 100 identifies the position $\alpha1$ on the x axis corresponding to a code peak CP3 as the tentative code peak position $\alpha1$ (also referred to as reference point 0).

The control section 100 stores the generated tentative code peak position information 158 in the second storage section 150.

As illustrated in FIG. 3, the terminal 20 stores variance value calculating range deciding program 118 in the first storage section 110. The variance value calculating range deciding program 118 is a program that the control section 100 generates variance value calculating range information 160 which indicates variance value calculating range A for performing a processing of calculating variance values such as correlation values a1 and the like indicated in the correlation information 156 based on a possible effect range of the indirect waves Sm to the correlation information of the direct waves Sd (curve L1 in FIG. 4($a$)) and the tentative code peak position $\alpha 1$. The processing of calculating variance values is an example of the statistical processing. The variance value calculating range A is an example of the statistical processing range. The variance value calculating range information 160 is an example of statistical processing range information. The variance value calculating range deciding program 118 and the control section 100 is an example of statistical processing range information generating means.

Figure 6:
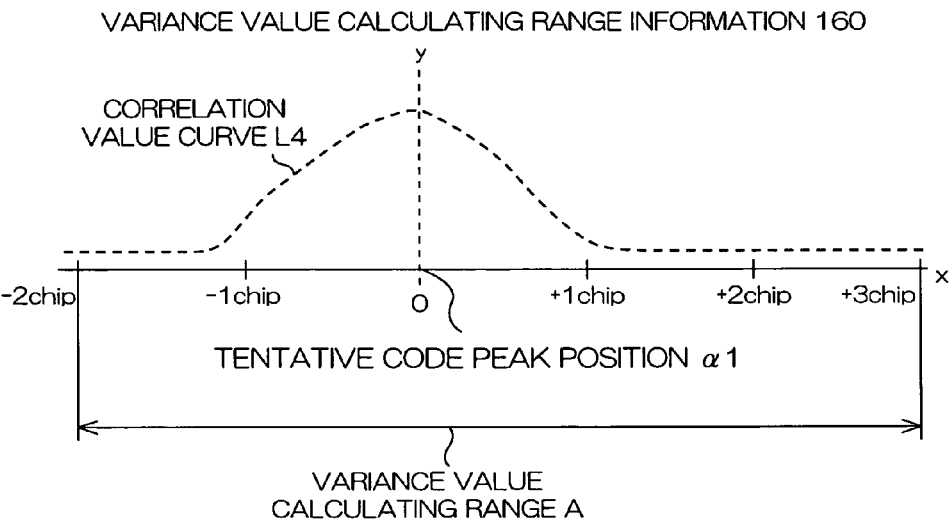
FIG. 6 schematically shows variance value calculating range information.

FIG. 6 illustrates an example of the variance value calculating range information 160.

As illustrated in FIG. 6, the control section 100 specifies as variance value calculating range A a range with the width of five chips consisting of two chips forward (on the left side) (−2 chips) and three chips backward (on the right side) (+3 chips) the tentative code peak position $\alpha 1$ which is assumed to be the reference point 0.

As is apparent from FIG. 4($b$) described above, a possible effect range of the indirect waves Sm to the direct waves Sd is the case where a beginning position $\gamma 1$ of the correlation curve L2 of the indirect waves Sm is located at the base of an isosceles triangle which consists of the code peak CP1 as the apex. In this case, it is clear that the base of an isosceles triangle which consists of the code peak CP4 of the indirect waves Sm as the apex moves within a range from one chip forward (−1 chip) and three chips backward (+3 chips) the reference point 0.

On the other hand, a range of two chips instead of a range of one chip forward the reference point 0 is included as the variance value calculating range A in order to reliably include the true peak beginning position $\beta$ in the variance value calculating range A when the true peak beginning position $\beta$ deviates forward from the tentative code peak position $\alpha 1$ (see FIG. 6) due to effects of the indirect waves Sm.

As illustrated in FIG. 3, the terminal 20 stores a variance value calculating program 120 in the first storage section 110. The variance value calculating program 120 is a program that the control section 100 calculates variance values b1 through b(m) of correlation values within the variance value calculating range A for each window W, which is specified as a limited range rather than the variance value calculating range A, and generates variance value information 162 which indicates the variance values. The window W is an example of partial range. The variance values b1 and the like are an example of statistical standard values. The variance value information 162 is an example of statistical standard information. The variance value calculating program 120 and the control section 100 is an example of the statistical standard information generating means.

It should be noted that information which indicates each variance value nl includes it's phase information (corresponding to a position on x axis in FIG. 7 to be described later).

FIGS. 7, 8, 9, 10, and 11 are diagrams for describing the variance value calculating program 120 and the like.

Figure 7:
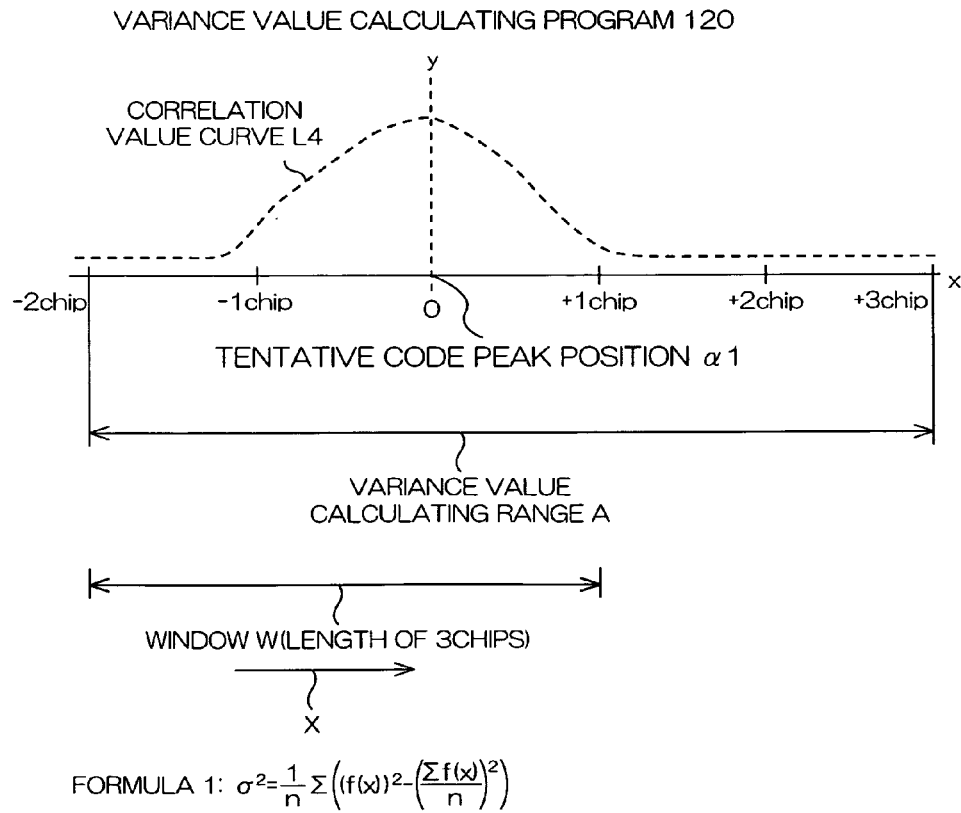

As illustrated in FIG. 7, the range of the window W corresponds to, for example, the length of three chips. The range of the window W is specified as a range including a necessary number of correlation values a1 and the like to compensate for noise floors in Gauss distribution.

The control section 100 calculates the variance values b1 and the like of the correlation values in the window W while moving the window W to the direction along an arrow X, for example. The variance values b1 and the like are calculated based on formula 1, which is a general formula for calculating variance. In the process of calculating the variance values b1 and the like, the effects of noise floors are compensated.

Figure 8:
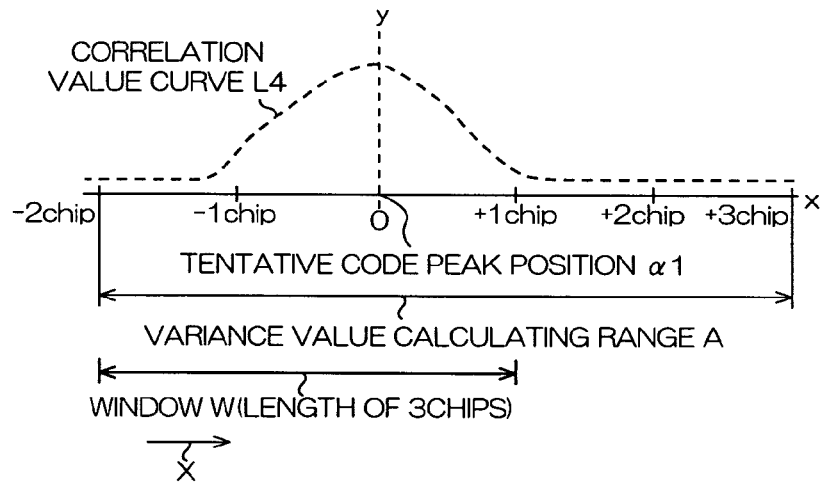
Figure 8:
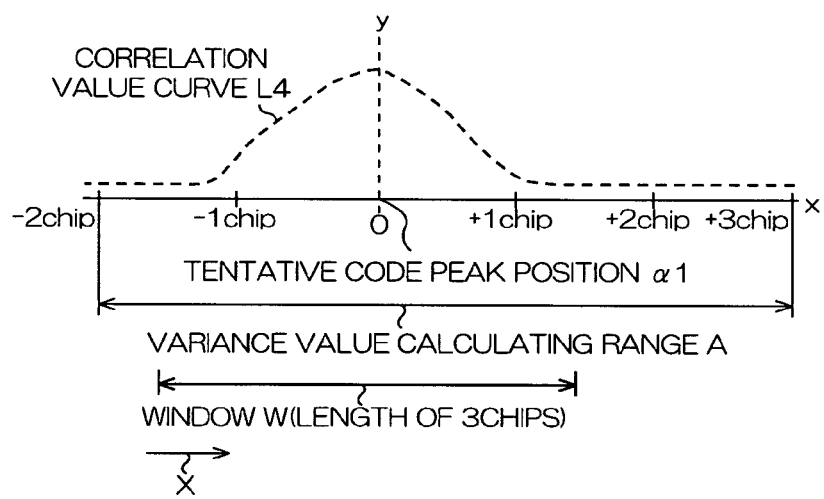
Figure 8:
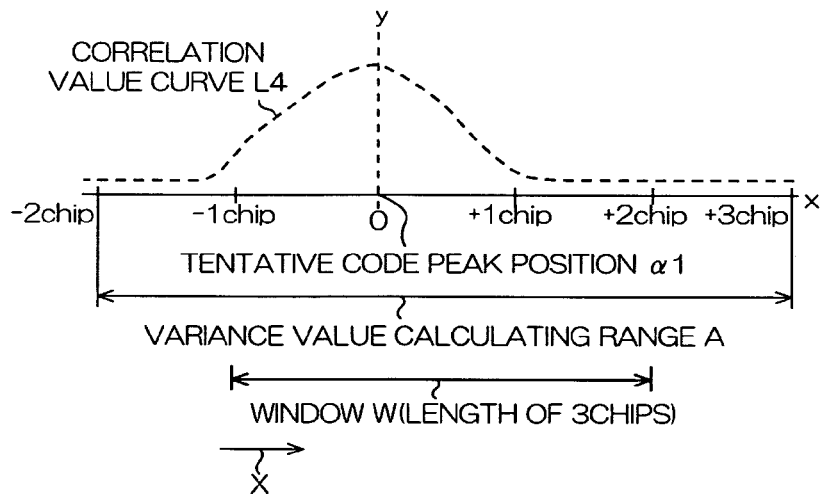

More specifically, the control section 100 calculates the variance values b1 and the like while gradually moving the window W from the beginning position shown in FIG. 8($a$) to the direction along the arrow X, and plots the variance values b1 and the like on the coordinate positions corresponding to the top of the window W along the direction of movement thereof. In other words, information which indicates the variance values b1 and the like includes information of coordinate positions thereof. In this manner, the correlation value curve L4 shown in FIG. 8($b$) is formed, and the curve then changes to the statues shown in FIGS. 8($c$), 9($a$), and 9($b$), sequentially. It should be noted that the variance values b1 and the like are calculated many times between the states of the curves shown in FIGS. 8($a$) and 8($b$), however, the description thereof is omitted.

Figure 9:
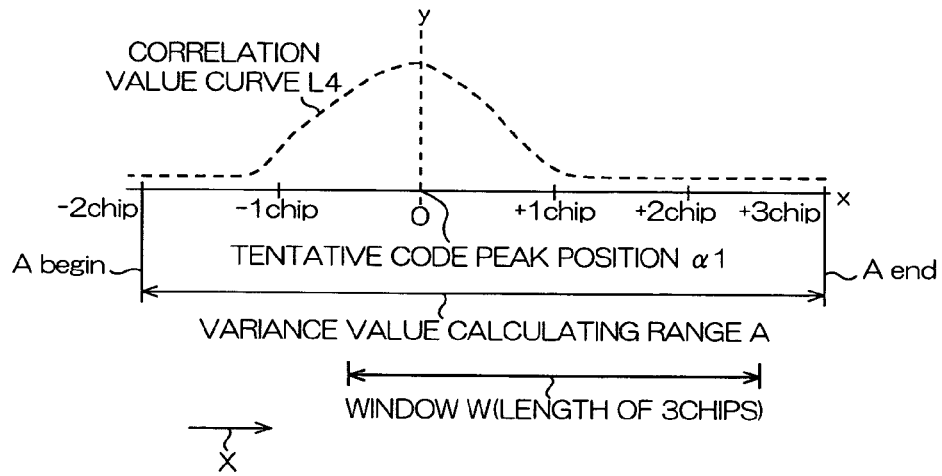
Figure 9:
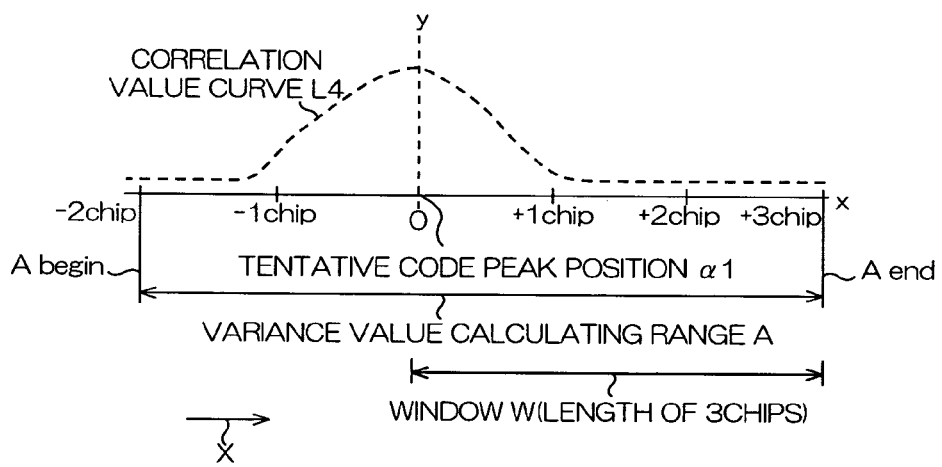
Figure 9:
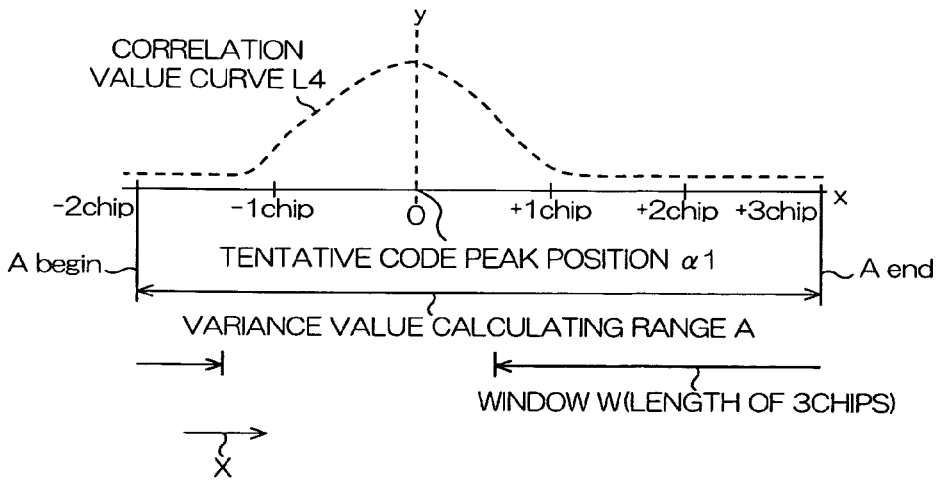

When the top of the window W along the direction of movement thereof reaches the end Aend of the variance value calculating range A, a part of the window W turns around extending back towards the beginning section Abegin side of the variance value calculating range A as illustrated in FIG. 9($c$).

Figure 10:
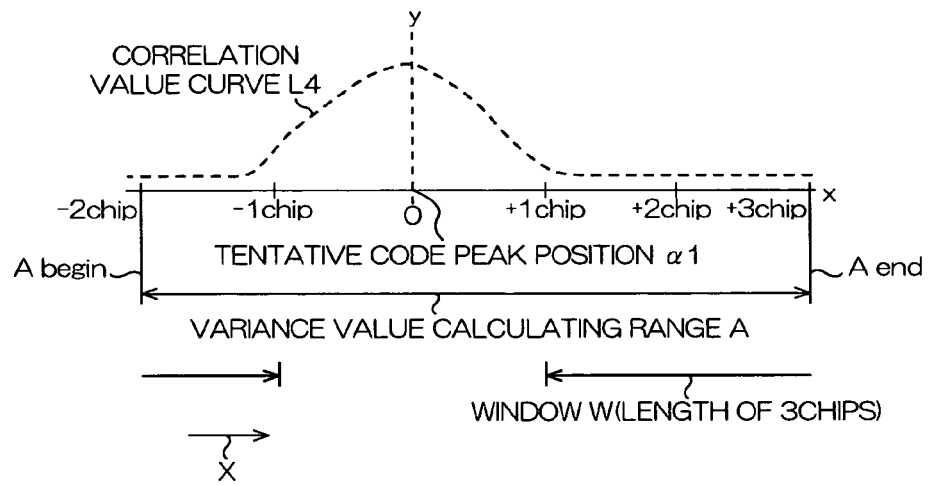
Figure 10:
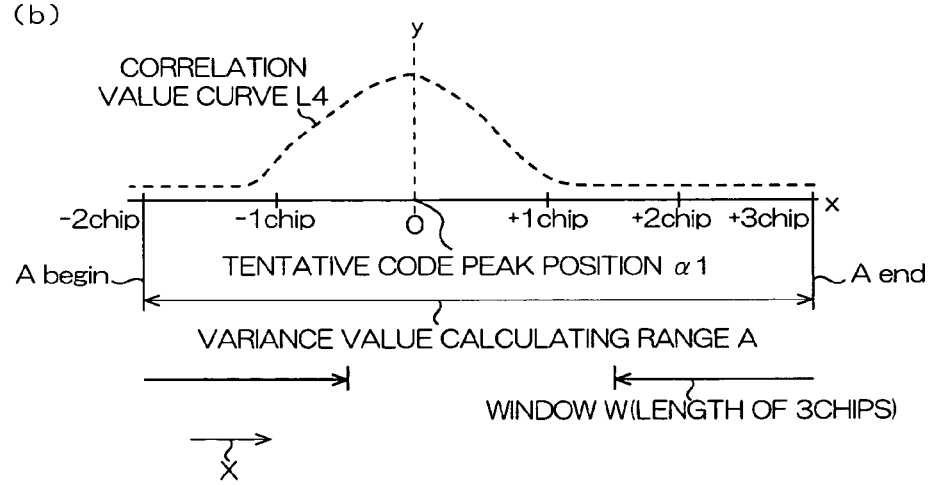
Figure 10:
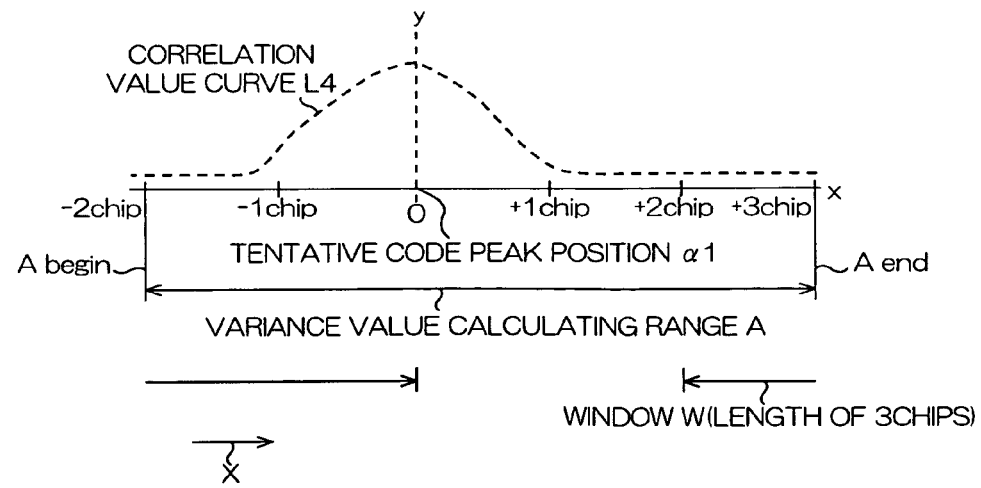

As illustrated in FIGS. 10($a$), 10($b$), 10($c$), and 11($a$), a part of the window W then turns around extending back towards the beginning section A begin side. This operation is repeated until just before the curve becomes the state of the curve shown in FIG. 8($a$).

Figure 11:
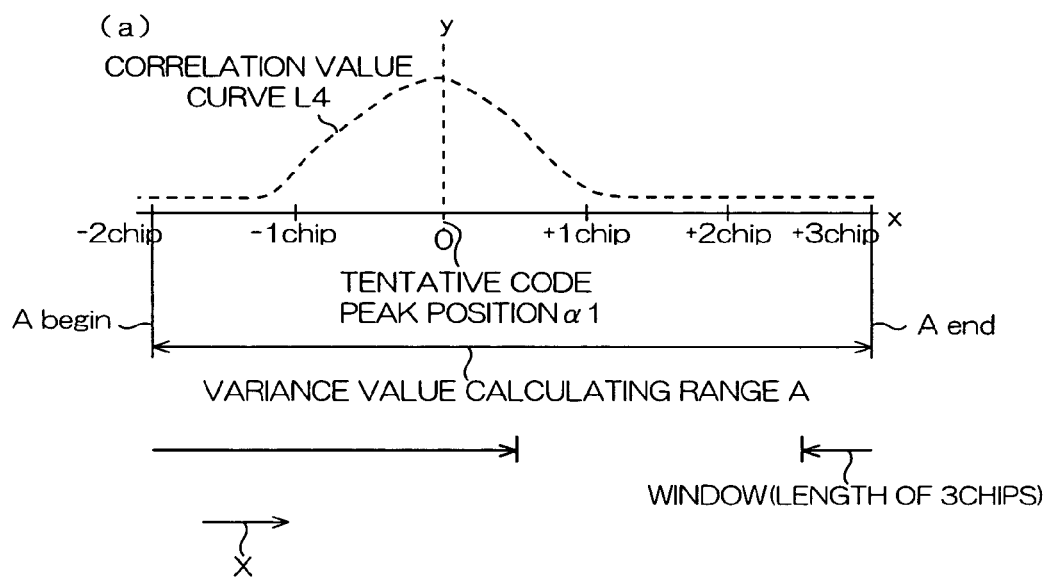
Figure 11:
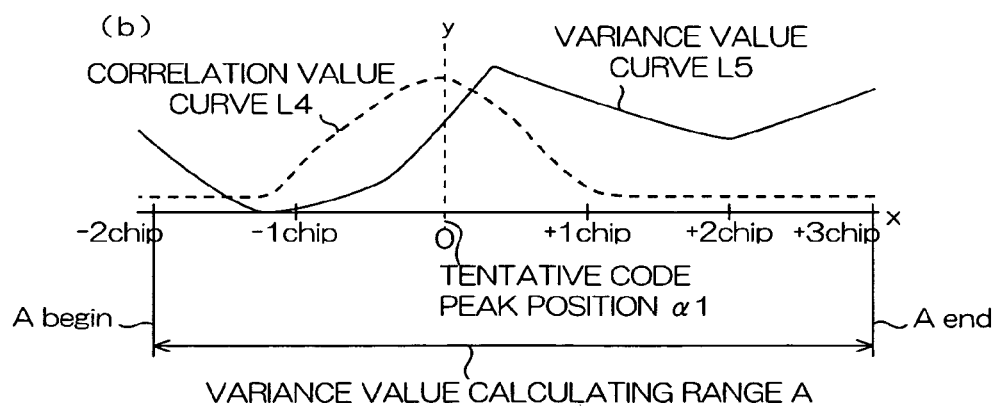

Connection of the variance values b1 and the like calculated as described above draws a variance value curve L5 shown in FIG. 11($b$).

FIGS. 12, 13, 14, and 15 schematically illustrate exemplary simulation results obtained by calculating the variance values b1 and the like and generating the variance value curve L5.

Figure 12:
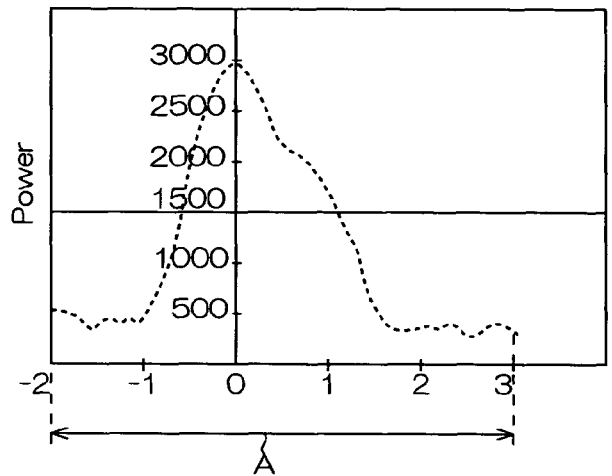
FIG. 12 schematically shows an example of simulation results for generating variance value curves.
Figure 12:
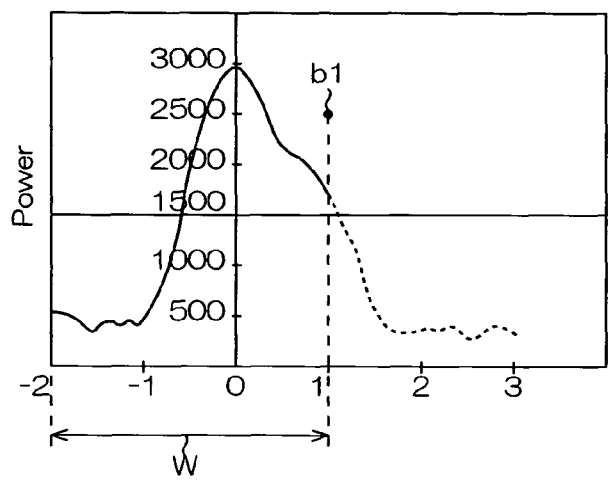
Figure 12:
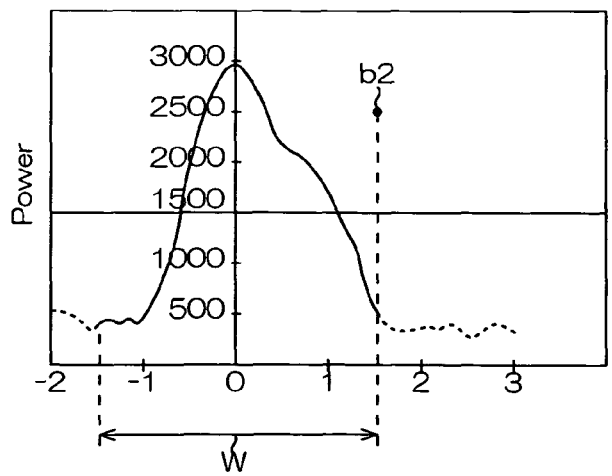
Figure 13:
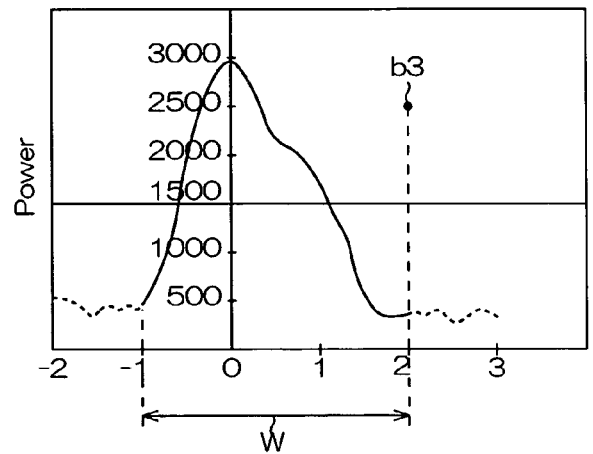
FIG. 13 schematically shows an example of simulation results for generating variance value curves.
Figure 13:
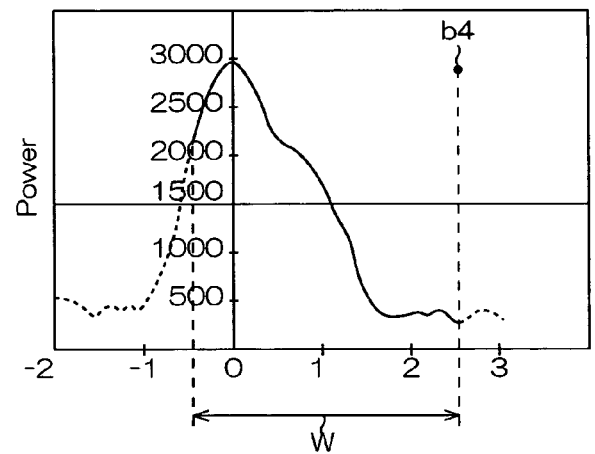
Figure 13:
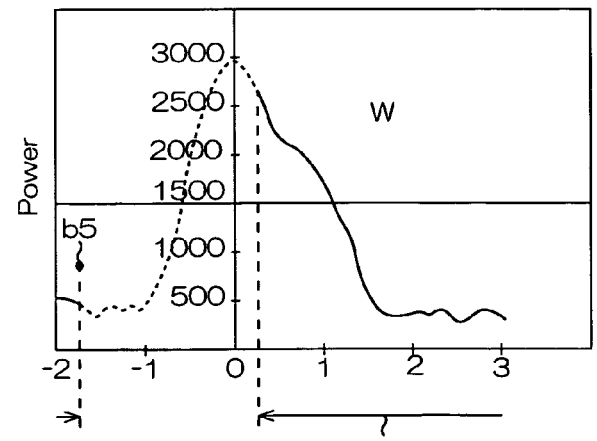
Figure 14:
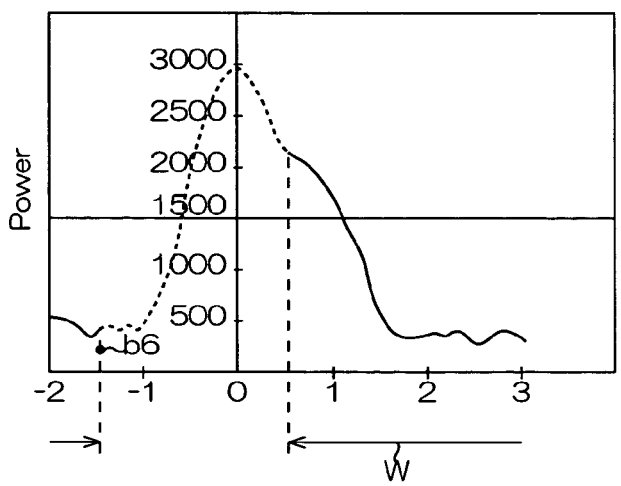
FIG. 14 schematically shows an example of simulation results for generating variance value curves.
Figure 14:
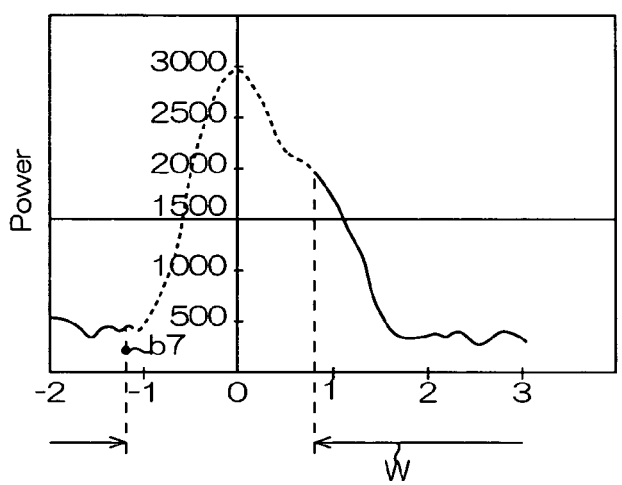
Figure 14:
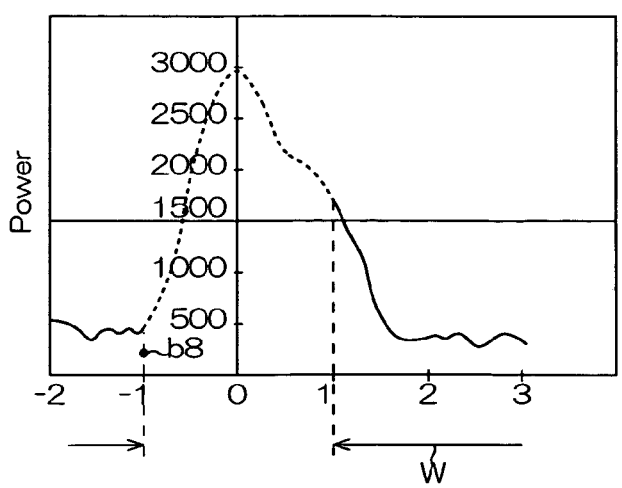
Figure 15:
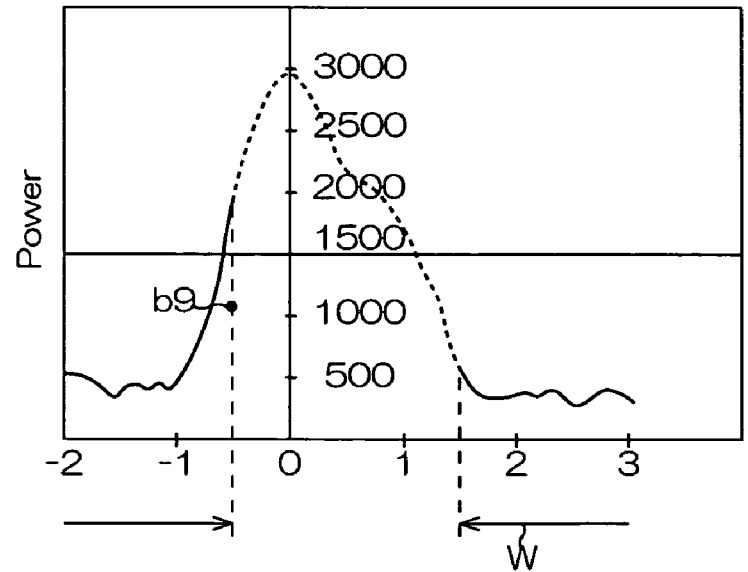
FIG. 15 schematically shows an example of simulation results for generating variance value curves.
Figure 15:
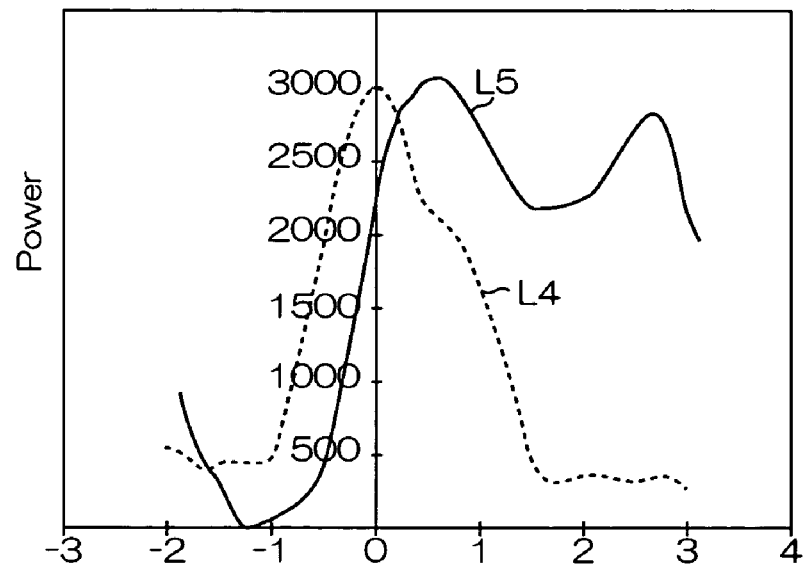

As illustrated in FIGS. 12($a$) through 12($c$), 13($a$) through 13($c$), 14($a$) through 14($c$), and 15($a$), the terminal 20 calculates the variance values b1 and the like of the correlation values a1 and the like made in a solid line of the width of the window W, and plots the variance values b1 and the like at the top of the window W along the direction of movement thereof. The terminal 20 then generates the variance value curve L5 shown in FIG. 15($b$) by connecting the variance values b1 and the like.

As illustrated in FIG. 3, the terminal 20 stores a code peak beginning position identifying program 124 in the first storage section 110. The code peak beginning position identifying program 124 is a program that the control section 100 generates code peak beginning position information 166 which indicates a code peak beginning position $\beta$ based on variance value curve information 164. The code peak beginning position information 166 is an example of beginning position information. The code peak beginning position identifying program 124 and the control section 100 is an example of beginning position information generating means.

Figure 16:
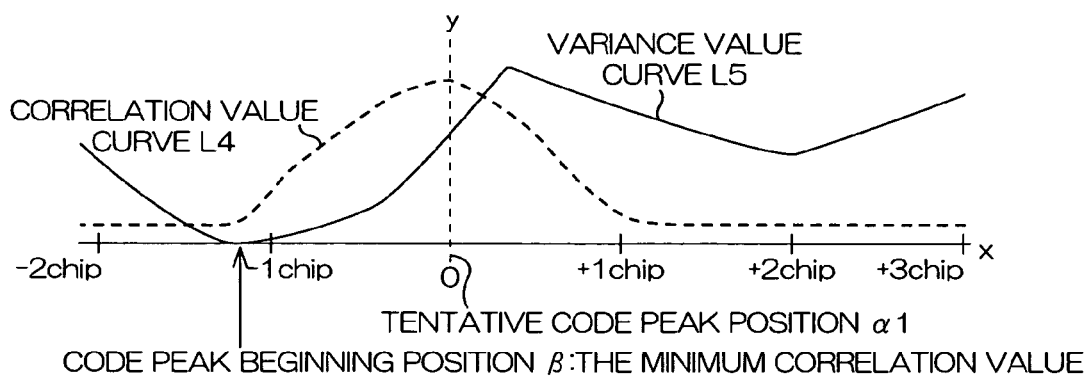
FIG. 16 is a diagram for describing a code peak beginning position identifying program.

FIG. 16 is a diagram for describing the code peak beginning position identifying program 124.

As illustrated in FIG. 16, the control section 100 identifies a position corresponding to the minimum variance value as the code peak beginning position β.

The control section 100 stores the generated code peak beginning position information 166 in the second storage section 150.

As illustrated in FIG. 3, the terminal 20 stores a code peak position deciding program 126 in the first storage section 110. The code peak position deciding program 126 is a program that the control section 100 generates code peak position information 168 which indicates a code peak position α2 corresponding to a code peak, which is the maximum correlation value between the direct waves and the replica C/A codes, based on the code peak beginning position information 166. The code peak position α2 is an example of direct wave code peak corresponding position. The code peak position information 168 is an example of direct wave code peak corresponding position information. The code peak position deciding program 126 and the control section 100 is an example of direct wave code peak corresponding position information generating means.

Figure 17:
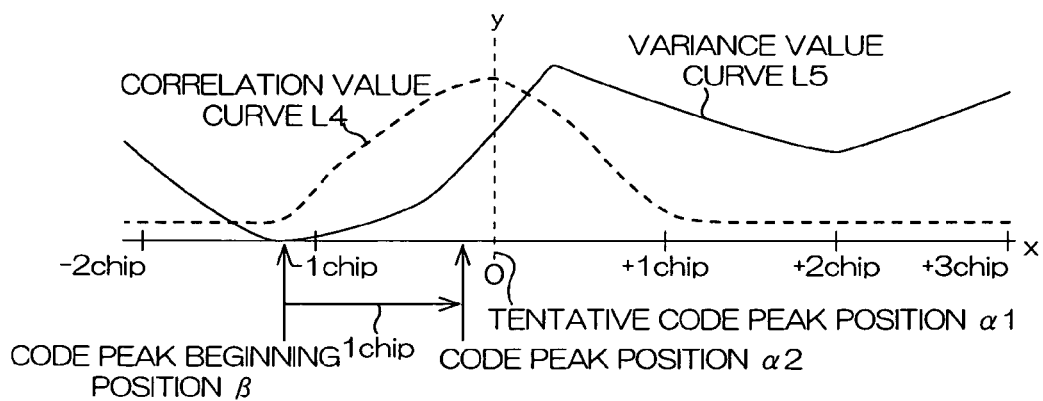
FIG. 17 is a diagram for describing a code peak position deciding program.

FIG. 17 is a diagram for describing the code peak position deciding program 126.

As illustrated in FIG. 17, the control section 100 decides a position one chip backward from the code peak beginning position β as the code peak position α2. This is based on the fact that the code peak position does not change (see FIG. 4(a)) when the frequency bandwidth is specified to be infinite even if the terminal 20 receives only direct waves Sd or both the direct waves Sd and the indirect waves Sm. In other words, the true code peak position locates at one chip backward from the code peak beginning position.

Here, the code peak beginning position β does not change both in the cases where only the direct waves Sd are received and the direct waves Sd and the indirect waves Sm are received even if the frequency bandwidth used for receiving them by the terminal 20 is decreased.

Thus, although the terminal 20 receives the radio waves S1 and the like through a narrow band, identification of the code peak beginning position β allows decision of the true code peak beginning position α2 as the position one chip backward therefrom.

The control section 100 stores the generated code peak position information 168 in the second storage section 150.

As illustrated in FIG. 3, the terminal 20 stores a pseudo range information generating program 128 in the first storage section 110. The pseudo range information generating program 128 is a program that the control section 100 generates pseudo range information 170 which indicates pseudo range d1 and the like from each of the GPS satellites 12a and the like using the code peak position information 168.

More specifically, the control section 100 calculates the pseudo distances d1 and the like by multiplying the time between the time at which the replica C/A code is generated so as to match with the code peak α2 and the time at which the C/A code is transmitted by the speed of light which is the speed of propagation of the radio waves S1 and the like. The time at which the C/A code is transmitted can be obtained from the received C/A code.

The control section 100 stores the generated pseudo range information 170 in the second storage section 150.

As illustrated in FIG. 3, the terminal 20 stores a positioning position information generating program 130 in the first storage section 110. The positioning position information generating program 130 is a program that the control section 100 positions a current position based on the pseudo range information 170, and generates positioning position information 172 which indicates a positioning position P.

The control section 100 calculates a position of each GPS satellite 12a or the like on the satellite orbit at the time at which the C/A code is transmitted using the ephemeris 152b, and positions a current position of the terminal 20 using the position on the satellite orbit and the aforementioned pseudo range d1 or the like. It should be noted that the detailed description of the positioning method is omitted.

As illustrated in FIG. 3, the terminal 20 stores a positioning position information outputting program 132 in the first storage section 110. The positioning position information outputting program 132 is a program that the control section 100 displays the positioning position information 172 on the display apparatus 36 (see FIG. 2).

The terminal 20 is configured as described above.

As mentioned above, the terminal 20 can generate the tentative code peak position information 158 (see FIG. 3). Here, the radio waves S1 and the like to be received by the terminal 20 may include not only direct waves, but also indirect waves. Therefore, the tentative code peak position α1 does not always match with the code peak in the case where only the direct waves are received.

The terminal 20 can generate the variance value calculating range information 160 (see FIG. 3). In other words, the terminal 20 does not use the tentative code peak position α1 as is for positioning, but uses it as a standard for specifying the variance value calculating range A.

The terminal 20 calculates the variance values within the range of the window W in the variance value calculating range A, and generates the variance value information 162. The range of the window W is specified as a range including a necessary number of correlation values to compensate for noise floors in Gauss distribution.

The terminal 20 can then generate the variance value curve information 164 which indicates variation in variance values based on the variance value information 162.

The terminal 20 can then generate the code peak beginning position information 166 which indicates the code peak beginning position β based on the variance value curve information 164. In this manner, the terminal 20 calculates the code peak beginning position β based on the variance value curve information 164 instead of based on the correlation information 156, the effects of noise floors are thereby eliminated. In other words, decrease in accuracy of the code peak beginning position β due to noise floors is eliminated. Here, the variance value curve information 164 is generated by calculating the variance values of the correlation values for each window W instead of performing time integration of the correlation information 156. In other words, since there is no need to generate multiple pieces of correlation information 156, the time to be taken for generation of them is not needed.

An inventor of this specification has confirmed through an experiment the fact that calculation of variance values for each of multiple windows W takes extremely shorter time than generation of multiple pieces of correlation information 156 in order to calculate a true code peak position by obtaining a necessary number of samples to eliminate or reduce the effects of noise floors. More specifically, an experiment result that it takes one second (s) from starting the satellite receiving program 112 to calculating the true code peak position α2 using the code peak position deciding program 126 is obtained.

The terminal 20 can also generate the code peak position information 168 based on the code peak beginning position information 166.

This allows calculation of the true code peak position a 2 by quickly eliminating the effects of the multipaths without performing time integration of the correlation results.

The terminal 20 can quickly calculate the true code peak position α2, resulting in quick generation of the positioning position information 172. Therefore, it is especially effective for mobile terminals.

The invention is not limited to this embodiment, for example, the average value of the correlation values a1 and the like may be calculated instead of the variance values of the correlation values a1 and the like using the variance value calculating program 120.

The structure of the terminal 20 in the embodiment according to the invention is described above. The operation example is hereinafter described mainly using FIG. 18.

Figure 18:
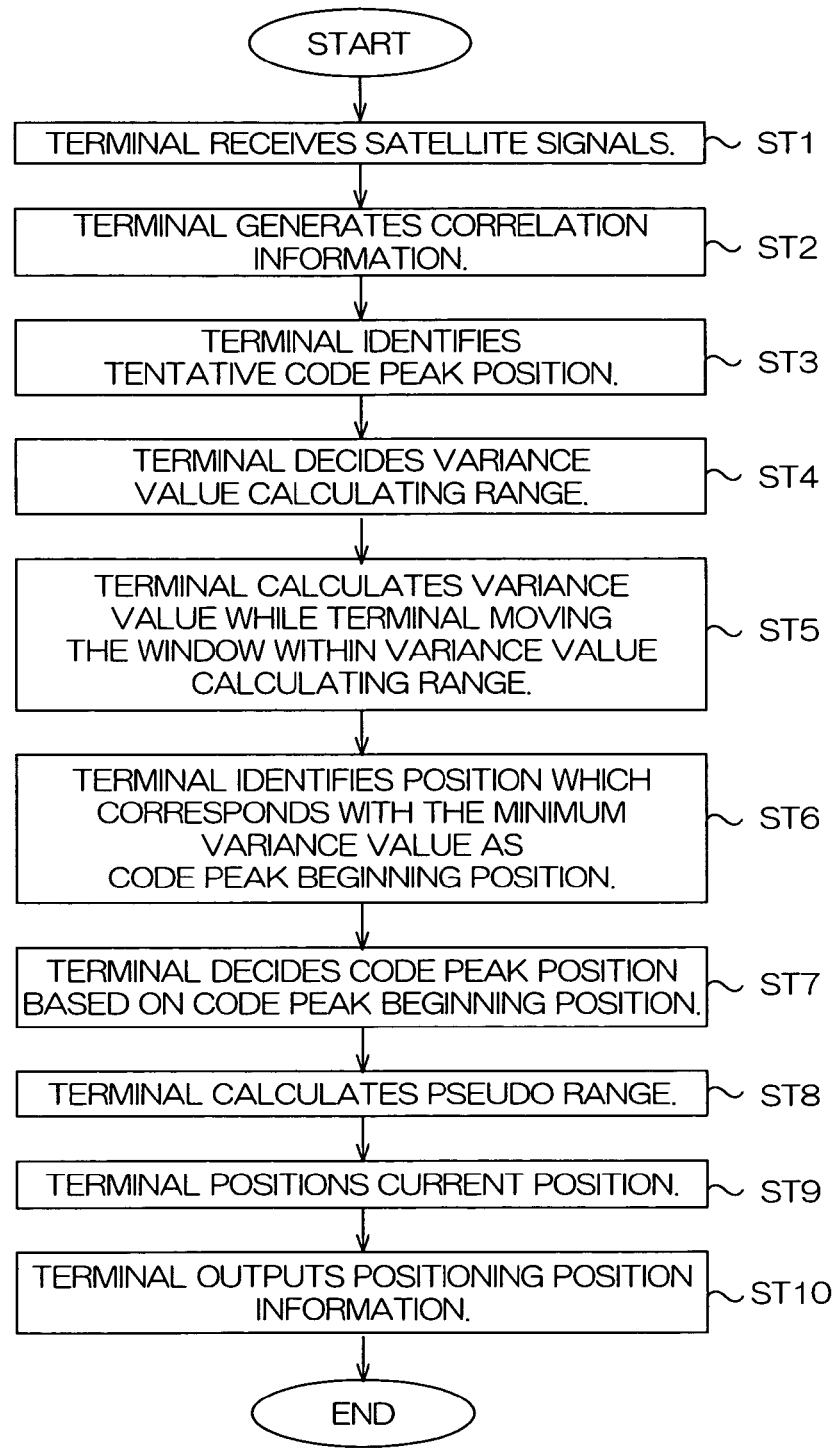
FIG. 18 schematically shows a flowchart of an operation example of the terminal.

FIG. 18 schematically illustrates a flowchart of an operation example of the terminal 20.

First, the terminal 20 receives the C/A codes put on the radio waves S1 and the like from the GPS satellites 12a and the like (step ST1 in FIG. 18). The step ST1 is an example of the step of receiving satellite signals.

Subsequently, the terminal 20 generates the correlation information 156 (see FIG. 3) (step ST2). The step ST2 is an example of the step of generating correlation information.

Next, the terminal 20 identifies the tentative code peak position α1 (see FIG. 3) (step ST3). The step ST3 is an example of the step of generating tentative code peak position information.

The terminal 20 then decides the variance value calculating range A (step ST4). The step ST4 is an example of the step of generating statistical processing range information.

The terminal 20 then calculates the variance values b1 and the like while moving the window W within the variance value calculating range A (step ST5). The step ST5 is an example of the step of generating statistical information.

Next, the terminal 20 identifies a position corresponding to the minimum variance value as the code peak beginning position β (see FIG. 3) (step ST6). The step ST6 is an example of the step of generating beginning position information.

The terminal 20 then decides the code peak position α2 (step ST7). The step ST7 is an example of the step of generating code peak corresponding position information.

The terminal 20 then calculates the pseudo range d1 and the like (step ST8).

Subsequently, the terminal 20 positions a current position, and generates the positioning position information 172 (see FIG. 3) (step ST9).

The terminal 20 then outputs the positioning position information 172 (step ST10).

The aforementioned steps allow calculation of the true code peak position by quickly eliminating the effects of the multipaths without performing time integration of the correlation results.

The present invention is not limited to the above-described respective embodiments. Further, the above-described respective embodiments may be combined with each other.

What is claimed is:

1. A position calculation method comprising:
   performing correlation calculations on a received signal in a phase direction, the received signal being a signal that may include an indirect wave in addition to a direct wave from a positioning satellite;
   identifying a phase that corresponds to a peak correlation value among correlation values obtained by the correlation calculations as a tentative peak phase;
   setting a variance value calculating range in the phase direction based on the tentative peak phase;
   providing a window having a phase range that is narrower than the variance value calculating range, and moving the window in the phase direction within the variance value calculating range;
   calculating a variance value of the correlation value within the window at each phase within a moving range of the window;
   identifying a beginning phase that corresponds to a beginning position to a true peak correlation value when the received signal does not include the indirect wave based on the phase of the window that corresponds to a minimum variance value among the calculated variance values;
   identifying a true peak phase based on the beginning phase; and
   calculating a current position using the true peak phase.

2. The position calculation method according to claim 1, the setting of the variance value calculating range including setting the variance value calculating range to be a phase range that is wider than a range that includes one chip forward and one chip backward the tentative peak phase.

3. The position calculation method according to claim 1, the setting of the variance value calculating range including setting the variance value calculating range to be a phase range that includes two chips forward and three chips backward the tentative peak phase.

* * * * *